US012806784B2

(12) United States Patent
Yamamoto et al.

(10) Patent No.: US 12,806,784 B2
(45) Date of Patent: Nov. 24, 2026

(54) SYSTEM INCLUDING A ROBOT AND AT LEAST ONE OF A MACHINE TOOL OR OTHER ROBOT AND CONTROL DEVICE

(71) Applicant: FANUC CORPORATION, Yamanashi (JP)

(72) Inventors: Tomoyuki Yamamoto, Yamanashi (JP); Hajime Suzuki, Yamanashi (JP); Kiichi Teramoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 164 days.

(21) Appl. No.: 18/287,755

(22) PCT Filed: May 21, 2021

(86) PCT No.: PCT/JP2021/019346
§ 371 (c)(1),
(2) Date: Oct. 20, 2023

(87) PCT Pub. No.: WO2022/244231
PCT Pub. Date: Nov. 24, 2022

(65) Prior Publication Data
US 2024/0198531 A1 Jun. 20, 2024

(51) Int. Cl.
*B25J 9/16* (2006.01)
*G05B 19/418* (2006.01)

(52) U.S. Cl.
CPC ...... *B25J 9/1682* (2013.01); *G05B 19/41825* (2013.01); *G05B 2219/39101* (2013.01); *G05B 2219/39105* (2013.01)

(58) Field of Classification Search
CPC ...... B25J 9/1671; B25J 9/1664; B25J 9/1682; B25J 9/0084; B25J 9/1651; B25J 9/1669;
(Continued)

(56) References Cited

U.S. PATENT DOCUMENTS 5,254,923 A * 10/1993 Kanitani .................. B25J 9/009
901/1
7,282,882 B2 * 10/2007 Kitatsuji .............. G05B 19/414
901/6
(Continued)

FOREIGN PATENT DOCUMENTS

CN 105209225 A 12/2015
CN 109746911 A 5/2019
(Continued)

OTHER PUBLICATIONS

International Search Report issued Jul. 6, 2021 in corresponding International Application No. PCT/JP2021/019346.

*Primary Examiner* — Ramon A. Mercado
*Assistant Examiner* — Noah W Stiebritz
(74) *Attorney, Agent, or Firm* — Wenderoth, Lind & Ponack, L.L.P.

(57) ABSTRACT

This system includes a robot and a machine tool or another robot for cooperating with each other, and the system is provided with a reference clock that updates time periodically. The robot and the machine tool or another robot is equipped with an internal clock, executes a created operation program on the basis of the internal clock, stores therein data regarding positions and times involved in the operation program between a synchronization start command and a synchronization end command, and operates, during synchronous operation in the operation program in synchronization with the reference clock on the basis of the reference clock and the stored data of the positions and times of the operation program.

18 Claims, 10 Drawing Sheets

(58) Field of Classification Search
CPC . B25J 9/1605; B25J 9/00; B25J 11/005; B25J 13/00; B25J 13/006; B25J 19/0095; G05B 19/41825; G05B 19/41815; G05B 2219/39101; G05B 2219/39105; G05B 2219/40306; G05B 2219/31261
See application file for complete search history.

(56) References Cited

U.S. PATENT DOCUMENTS

| | | | | | |
|---|---|---|---|---|---|
| 7,729,804 | B2 * | 6/2010 | Matsumoto | G05B 19/41815<br>700/19 |
| 10,625,420 | B2 * | 4/2020 | Imanishi | B25J 9/1666 |
| 2003/0090490 | A1 * | 5/2003 | Watanabe | G05B 19/4069<br>345/473 |
| 2006/0145647 | A1 | 7/2006 | Kitatsuji et al. | |
| 2006/0217841 | A1 | 9/2006 | Matsumoto et al. | |

FOREIGN PATENT DOCUMENTS

| | | | | | |
|---|---|---|---|---|---|
| JP | 3-60990 | | | 3/1991 | |
| JP | H05-204442 | A | | 8/1993 | |
| JP | 6-67715 | | | 3/1994 | |
| JP | 8-381 | | | 1/1996 | |
| JP | 2001-27904 | | | 1/2001 | |
| JP | 2004-337710 | | | 12/2004 | |
| JP | 2005-18605 | | | 1/2005 | |
| JP | 2009-279608 | | | 12/2009 | |
| JP | 2009279608 | A | * | 12/2009 | |
| KR | 101408075 | B1 | * | 6/2014 | H04W 72/56 |
| WO | 2022/168337 | | | 8/2022 | |

* cited by examiner

FIG. 3

```
1:   LABEL[1];
2:   SYNCHRONIZATION START CLOCK 100;
3:   LINE P[1] 2000mm/sec SMOOTH;
4:   LINE P[2] 2000mm/sec SMOOTH;
5:   LINE P[3] 2000mm/sec SMOOTH;
6:   LINE P[4] 2000mm/sec SMOOTH;
7:   LINE P[5] 2000mm/sec SMOOTH;
8:   LINE P[6] 2000mm/sec SMOOTH;
9:   SYNCHRONIZATION END;
10:  JUMP LABEL[1];
```

FIG. 4

| CLOCK TIME | POSITION(x) | POSITION(y) | POSITION(z) |
|---:|---:|---:|---:|
| 0 | 2300 | 2000 | 900 |
| 1 | 2300 | 2000 | 900 |
| 2 | 2300.7 | 1999.5 | 901 |
| 3 | 2301.7 | 1999.1 | 902 |
| ... | ... | ... | ... |
| 100 | 2500 | 0 | 1000 |
| 101 | 2500 | −0.5 | 1000 |
| 102 | 2499.7 | −1.2 | 999 |
| 103 | 2499.4 | −2.4 | 998 |
| ... | ... | ... | ... |

FIG. 10

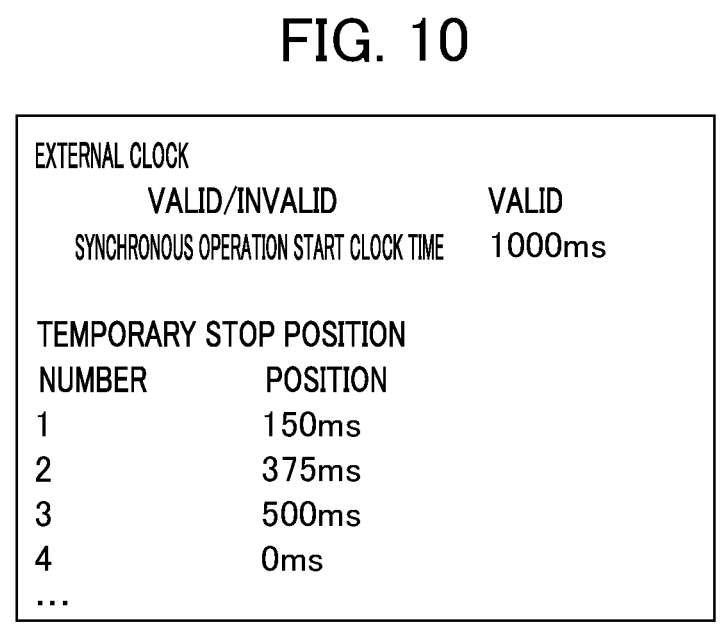

EXTERNAL CLOCK

| | |
|---|---|
| VALID/INVALID | VALID |
| SYNCHRONOUS OPERATION START CLOCK TIME | 1000ms |

TEMPORARY STOP POSITION

| NUMBER | POSITION |
|---|---|
| 1 | 150ms |
| 2 | 375ms |
| 3 | 500ms |
| 4 | 0ms |
| … | |

```
1:    LABEL[1];
2:    LINE P[1] 2000mm/sec SMOOTH CLOCK200;
3:    LINE P[2] 2000mm/sec SMOOTH CLOCK300;
4:    LINE P[3] 2000mm/sec SMOOTH CLOCK400;
5:    LINE P[4] 2000mm/sec SMOOTH CLOCK600;
6:    LINE P[5] 2000mm/sec SMOOTH CLOCK700;
7:    LINE P[6] 2000mm/sec SMOOTH CLOCK800;
8:    JUMP LABEL[1];
```

SYSTEM INCLUDING A ROBOT AND AT LEAST ONE OF A MACHINE TOOL OR OTHER ROBOT AND CONTROL DEVICE

TECHNICAL FIELD

The present invention relates to a system and a control device.

BACKGROUND ART

In some cases, a robot and a machine tool work in cooperation with each other. In these cases, an interlock signal is provided in order for the robot and the machine tool (hereinafter these components will also be referred to as "instruments" as necessary) not to interfere with each other. After the end of the work by one instrument, other instruments enter a work area based on the interlock signal. With this configuration, interference between the instruments can be prevented.

In recent years, in order to further improve a work efficiency, techniques of installing one system clock (reference clock) in the entire system to synchronize instruments with each other have been proposed. For example, see Patent Documents 1 to 3. In any of these techniques, each instrument has an internal clock and an operation program in which the position of the instrument and the internal clock correspond to each other. Each instrument adjusts the internal clock thereof according to the system clock (reference clock), or the reference clock is adjusted according to adjustment of the internal clock of each instrument. In this manner, the instruments are synchronized with each other in the system.

Patent Document 1: Japanese Unexamined Patent Application, Publication No. H3-60990

Patent Document 2: Japanese Examined Patent Application Publication No. H8-381

Patent Document 3: Japanese Unexamined Patent Application, Publication No. 2009-279608

DISCLOSURE OF THE INVENTION

Problems to be Solved by the Invention

Conventionally, in a case where a synchronous position is specified by teaching according to operation statements of a program for synchronous operation of a robot, such a synchronous position needs to be a teaching point of a certain operation statement in the program. However, for example, in an operation program of FIG. 11B for performing inter-press handling operation as shown in FIG. 11A, a synchronization start/end position (e.g., a position at the front of the robot) is not always taught, leading to inconvenience.

Note that positions with numbers "1" to "6" in FIG. 11A each correspond to teaching positions P(1) to P(6) in the operation program of FIG. 11B.

For this reason, instead of specifying the synchronous position in advance by teaching according to the operation statements of the program for the synchronous operation of the robot, there has been a demand for a technique of specifying a synchronous position based on an arbitrary position on a robot operation path or a clock time corresponding thereto.

Means for Solving the Problems (1) One aspect of the system of the present disclosure is a system including a robot and at least one of a machine tool or other robot, the robot and at least one of the machine tool or the other robot cooperating with each other. The system includes a reference clock that periodically updates a clock time. At least one of the robot, the machine tool, or the other robot includes an internal clock, a saving unit that saves, by executing a created operation program in advance based on the internal clock, data on a position and a clock time from a synchronization start command to a synchronization end command of the operation program, and an operation unit that operates at least one of the robot, the machine tool, or the other robot in synchronization with the reference clock based on the reference clock and the position and clock-time data of the operation program saved by the saving unit in synchronous operation according to the operation program.

(2) One aspect of the system of the present disclosure is a system including a robot and at least one of a machine tool or other robot, the robot and at least one of the machine tool or the other robot cooperating with each other. The system includes a reference clock that periodically updates a clock time. At least one of the robot, the machine tool, or the other robot includes an internal clock, a saving unit that saves, by causing a simulation device that simulates at least one of the robot, the machine tool, or the other robot to execute a created operation program in advance, data on a position and a clock time from a synchronization start command to a synchronization end command of the operation program, and an operation unit that operates at least one of the robot, the machine tool, or the other robot in synchronization with the reference clock based on the reference clock and the position and clock-time data of the operation program saved by the saving unit in synchronous operation according to the operation program.

(3) One aspect of the control device of the present disclosure is a control device for the robot used in the system according to (1) or (2).

(4) One aspect of the control device of the present disclosure is a control device for at least one of the machine tool or the other robot used in the system according to (1) or (2).

Effects of the Invention

According to one aspect, instead of specifying the synchronous position in advance by teaching according to the operation statements of the program for the synchronous operation of the robot, the synchronous position can be specified based on the arbitrary position on the robot operation path or the clock time corresponding thereto.

BRIEF DESCRIPTION OF THE DRAWINGS

FIG. 3 is a view showing one example of an operation program according to one embodiment;

FIG. 4 is a table showing one example of interpolation data according to one embodiment;

FIG. 10 is a view showing one example of a display screen for setting a temporary stop position;

PREFERRED MODE FOR CARRYING OUT THE INVENTION

First, the outline of the present embodiment will be described. In the present embodiment, a system includes a robot and at least one of a machine tool or other robot, the robot and at least one of the machine tool or the other robot cooperating with each other. At least one of the robot, the machine tool, or the other robot saves, by executing a created operation program in advance based on an internal clock, data on positions and clock times from a synchronization start command to a synchronization end command of the operation program. At least one of the robot, the machine tool, or the other robot in the system operates in synchronization with a reference clock based on the reference clock and the saved position and clock-time data of the operation program in synchronous operation according to the operation program.

With this configuration, according to the present embodiment, the object of "specifying the synchronous position based on the arbitrary position on the robot operation path or the clock time corresponding thereto instead of specifying the synchronous position in advance by teaching according to the operation statements of the program for the synchronous operation of the robot" as described in "Problems to be Solved by the Invention" can be achieved.

Described above is the outline of the present embodiment.

Next, the configuration of the present embodiment will be described in detail with reference to the drawings. Here, the case of using two press machines as machine tools will be described as an example. Note that the present invention is also applicable to cases where the machine tools are machines other than the press machines, other robots, etc.

Figure 1:
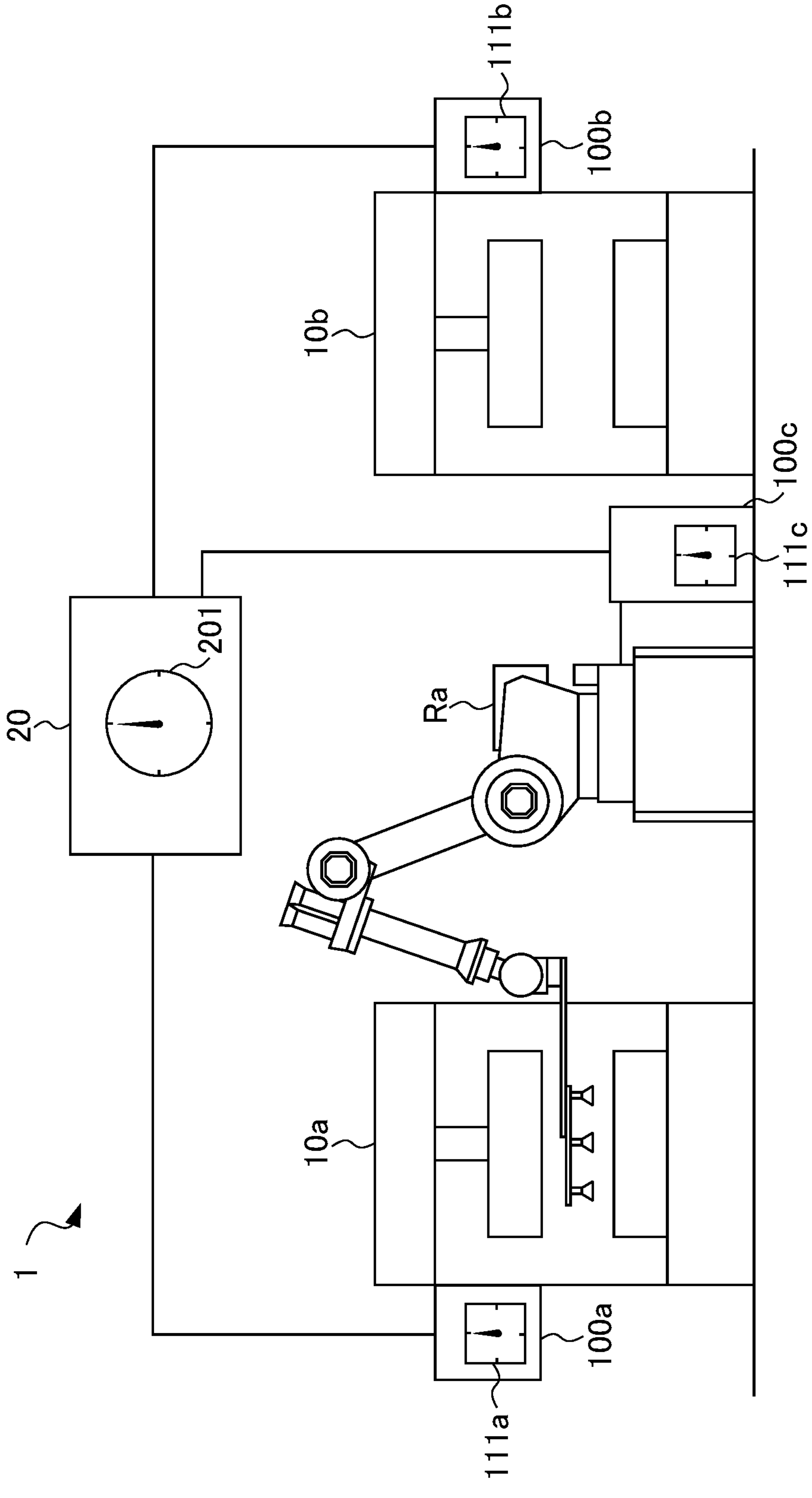
FIG. 1 is a view showing one example of the configuration of a system according to one embodiment.

FIG. 1 is a view showing one example of the configuration of a system according to one embodiment. As shown in FIG. 1, the system 1 has press machines 10*a*, 10*b*, control devices 100*a*, 100*b* that control the press machines 10*a*, 10*b*, a robot Ra, a control device 100*c* that controls the robot Ra, and a PLC 20.

For example, in the system 1 shown in FIG. 1, the robot Ra takes out a workpiece (not shown) pressed by the press machine 10*a* and places the workpiece in the press machine 10*b*, and the press machine 10*b* presses the placed workpiece (not shown). The workpiece (not shown) pressed by the press machine 10*b* is taken out, for example, by a not-shown robot.

The control devices 100*a* to 100*c* and the PLC 20 may be directly connected to each other via a not-shown connection interface. Alternatively, the control devices 100*a* to 100*c* and the PLC 20 may be connected to each other via a not-shown network such as a local area network (LAN) or the Internet. In this case, the control devices 100*a* to 100*c* and the PLC 20 include not-shown communication units that communicate with each other via such connection.

The PLC 20 is a programmable logic controller well-known by those skilled in the art, and operates as a higher-level device for the control devices 100*a*, 100*b* that control the press machines 10*a*, 10*b* and the control device 100*c* that controls the robot Ra.

Moreover, the PLC 20 includes a reference clock 201 that periodically updates a clock time.

The press machines 10*a*, 10*b* are press machines well-known by those skilled in the art, and operate based on operation commands from the control devices 100*a*, 100*b*.

The robot Ra is, for example, a six-axis vertical articulated robot, and based on a drive command from the control device 100*c*, drives a not-shown servo motor arranged on each articulated shaft of the robot Ra to take out the workpiece (not shown) pressed by the press machine 10*a* and place the workpiece in the press machine 10*b*. Moreover, an end effector for taking out the workpiece (not shown), such as a gripping hand, is attached to a tip end portion of the robot Ra, for example.

The control devices 100*a*, 100*b* are, for example, numerical control devices well-known by those skilled in the art, and include later-described internal clocks 111*a*, 1/1*b*. The control devices 100*a*, 100*b* generate the operation commands based on control information and the internal clocks 111*a*, 111*b* to transmit the generated operation commands to the press machines 10*a*, 10*b*. In this manner, the control devices 100*a*, 100*b* control operation of the press machines 10*a*, 10*b*.

Note that in a case where the press machines 10*a*, 10*b* are robots, the control devices 100*a*, 100*b* may be robot control devices, for example.

Devices targeted for control by the control devices 100*a*, 100*b* are not limited to the press machines 10*a*, 10*b* or the robots, and the control devices 100*a*, 100*b* are broadly applicable to general industrial machines. The industrial machines include, for example, various machines driven by actuators, such as a machine tool, an industrial robot, a service robot, a forge rolling machine, and an injection molding machine.

In the present embodiment, numerical control devices will be described as an example of the control devices 100*a*, 100*b*.

The control device 100*c* is a robot control device (also called a "robot controller") including a later-described internal clock 111*c* and outputting the drive command to the robot Ra based on an operation program and the internal clock 111*c* to control operation of the robot Ra.

Hereinafter, the control devices 100*a* to 100*c* will be collectively referred to as a "control device(s) 100" in a case where the control devices 100*a* to 100*c* do not need to be distinguished from each other. Moreover, the internal clocks 111*a* to 111*c* will be collectively referred to as an "internal clock(s) 111" in a case where the internal clocks 111*a* to 111*c* do not need to be distinguished from each other.

The control device 100 constantly monitors the clock time of the reference clock 201 such that the clock time of the internal clock 111 for the control target instrument of the control device 100 itself is adjusted to the clock time of the reference clock 201 of the PLC 20. In a case where there is a difference between the clock time of the reference clock 201 and the clock time of the internal clock 111, the control device 100 performs, using a well-known technique (e.g., Patent Document 3), correction calculation (hereinafter also referred to as "internal clock correction calculation") for changing an extent (hereinafter also referred to as "increment time") to which the internal clock 111 for the control target instrument is set forward in every interpolation period such that the clock time of the internal clock 111 is adjusted to the clock time of the reference clock 201. With this configuration, the clock time of the reference clock 201 and the clock time of the internal clock 111 are coincident with each other after a lapse of certain time.

Note that in some instruments in the system 1, even after the internal clock correction calculation has been performed, the time difference between the reference clock 201 and the internal clock 111 is not decreased and time advances with a certain time difference in some cases. In these cases, the control device 100 for such an instrument cannot adjust the clock time of the internal clock 111 to the clock time of the reference clock 201 by the internal clock correction calculation, and it is determined that the increment time of the reference clock 201 is greater than the increment time of the internal clock 111 for the instrument. In this case, the control device 100 for such an instrument recalculates (hereinafter also referred to as "reference clock correction calculation"), using a well-known technique (e.g., Patent Document 3), such an increment time of the reference clock 201 that the internal clock 111 for the instrument is synchronizable with the reference clock 201, and outputs the increment time to the reference clock 201.

With this configuration, the instrument for which the increment time of the reference clock 201 has been changed can be synchronized with the reference clock. Thereafter, the control devices 100 for other instruments perform the internal clock correction calculation such that the clock times of the internal clocks 111 for the other instruments are adjusted to the clock time of the reference clock 201 with the changed increment time. Accordingly, each instrument is synchronized with the reference clock 201, and as a result, the instruments in the system 1 can operate in synchronization with each other.

Figure 2:
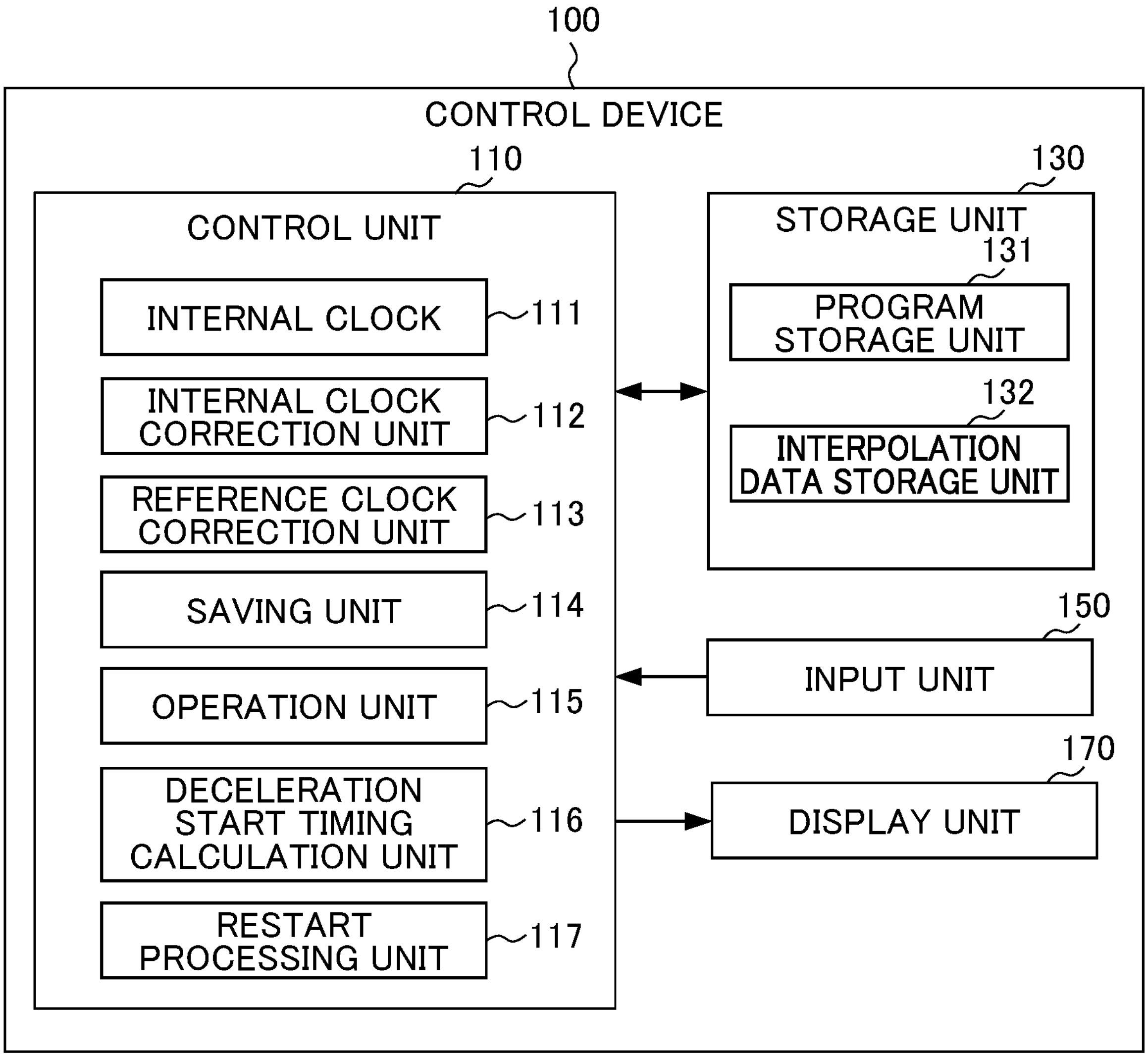
FIG. 2 is a functional block diagram showing a functional configuration example of a control device.

FIG. 2 is a functional block diagram showing a functional configuration example of the control device 100.

As shown in FIG. 2, the control device 100 has a control unit 110, a storage unit 130, an input unit 150, and a display unit 170. The control unit 110 has the internal clock 111, an internal clock correction unit 112, a reference clock correction unit 113, a saving unit 114, an operation unit 115, a deceleration start timing calculation unit 116, and a restart processing unit 117.

<Storage Unit 130>

The storage unit 130 is, for example, a read only memory (ROM) or a hard disk drive (HDD), and stores a system program, an application program, etc. to be executed by the later-described control unit 110. The storage unit 130 includes a program storage unit 131 and an interpolation data storage unit 132.

The program storage unit 131 stores, for example, an operation program (teaching program) for each type of operation for operating the instrument.

FIG. 3 is a view showing one example of the operation program according to one embodiment. Note that FIG. 3 shows the operation program for the robot Ra, but the same also applies to the press machines 10*a*, 10*b*.

Figures 11A, 11B:
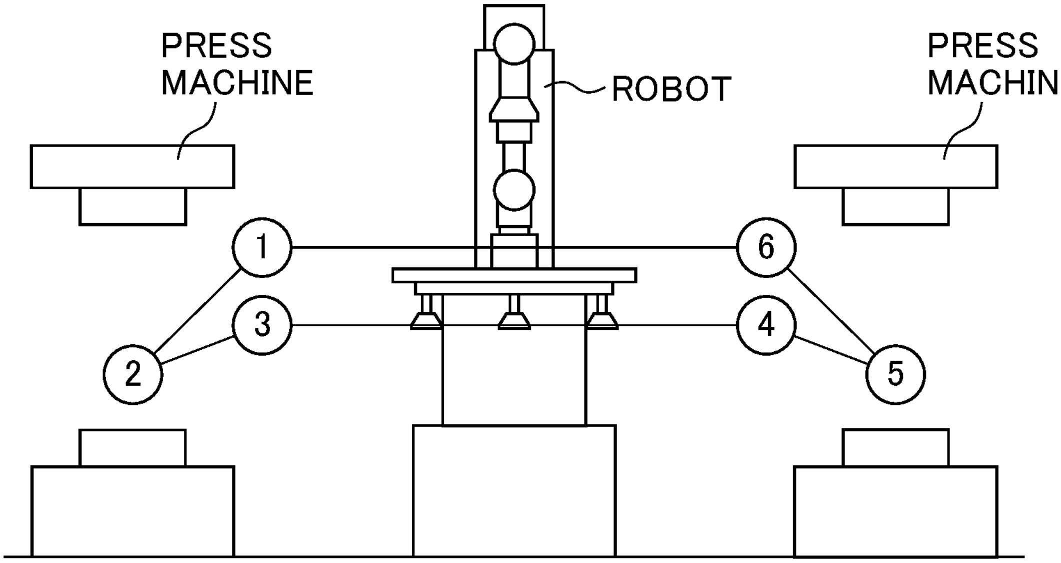
FIG. 11A is a view showing one example of a path in inter-press handling operation.
FIG. 11B is a view showing one example of an operation program for performing the inter-press handling operation shown in FIG. 11A.

The operation program shown in FIG. 3 controls operation of the robot Ra such that the robot Ra passes through the teaching positions P(1) to P(6) shown in FIG. 11A. In the conventional operation program of FIG. 11B, clock commands (e.g., "CLOCK 200") are added to operation statements of second to seventh lines to be synchronized with the reference clock 201. On the other hand, the operation program of FIG. 3 is different from such an operation program in that a synchronization start command of a second line ("SYNCHRONIZATION START CLOCK 100") and a synchronization end command ("SYNCHRONIZATION END") of a ninth line are added before and after operation statements of third to eighth lines to be synchronized.

Note that in description below, for the operation program stored in the program storage unit 131, a synchronization start clock time etc. are adjusted in advance in order to prevent interference with other instruments, such as collision.

For example, the later-described saving unit 114 executes the operation program of FIG. 3 in advance in a mode in which no synchronization with the reference clock 201 is made. Accordingly, for each instrument and each operation program, the interpolation data storage unit 132 stores, as interpolation data, data on the position of the instrument and the clock time in every interpolation period (e.g., 1 ms) from the synchronization start command to the synchronization end command of the operation program based on the internal clock 111. Note that the position of the instrument indicates, for example, the position of a slide in the case of the press machines 10*a*, 10*b* and the position of the end effector in the case of the robot Ra.

FIG. 4 is a table showing one example of the interpolation data according to one embodiment. Note that FIG. 4 shows the interpolation data on the robot Ra, but the same also applies to the press machines 10*a*, 10*b*. Moreover, the interpolation data of FIG. 4 shows a case where the interpolation period is 1 ms, but the same also applies to any value of the interpolation period.

<Input Unit 150>

The input unit 150 is, for example, a keyboard or a touch panel arranged on the later-described display unit 170, and receives input from a user. The input unit 150 may function as, for example, a specifying unit that arbitrarily specifies the synchronization start clock time (or a synchronization start position), such as 100 ms, indicated by the second line of the operation program as shown in FIG. 3 based on input operation by the user such as a worker.

<Display Unit 170>

The display unit 170 is, for example, a liquid crystal display, and displays the interpolation data stored in the interpolation data storage unit 132 and displays a user interface that receives the synchronization start clock time or the synchronization start position specified via the input unit 150 as the specifying unit.

Figure 5A:
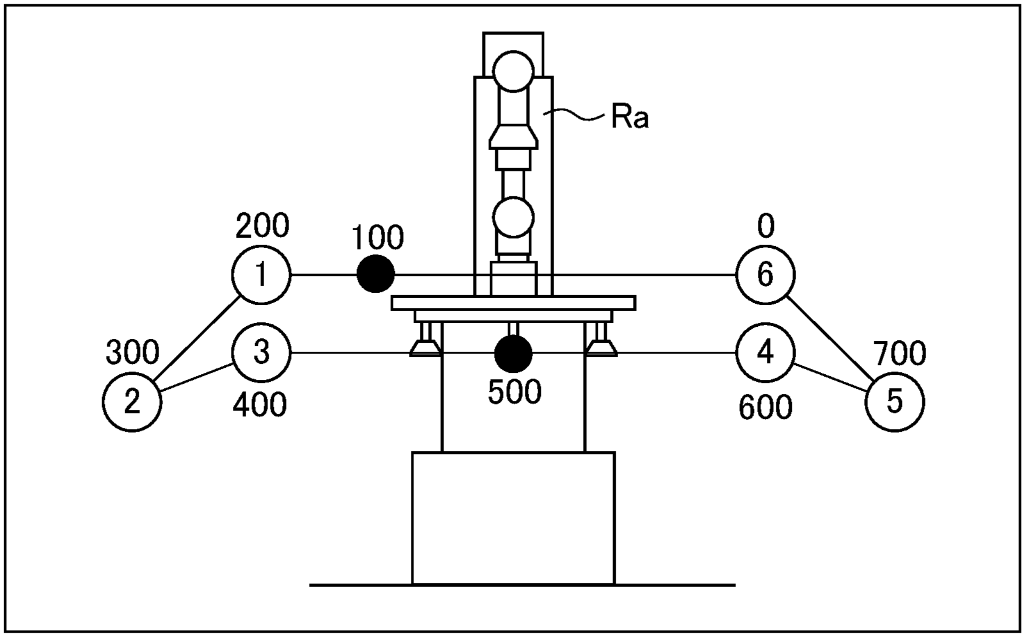
FIG. 5A is a view showing one example of an interpolation data display screen.
Figure 5B:
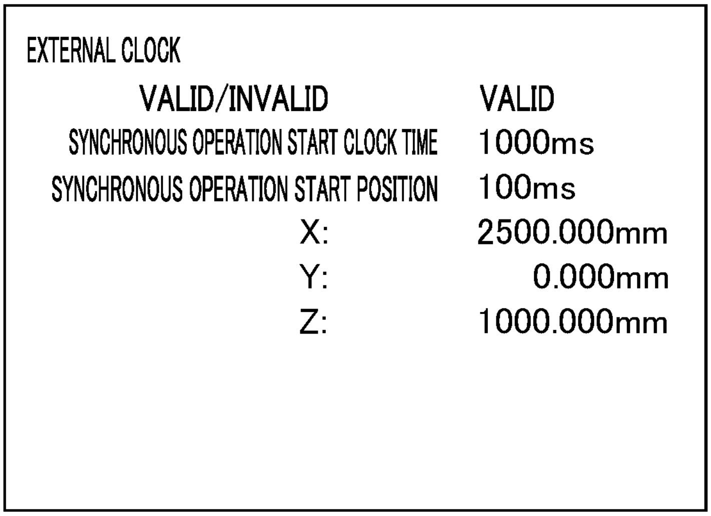
FIG. 5B is a view showing one example of the interpolation data display screen.

FIGS. 5A and 5B are views showing one example of an interpolation data display screen. On the display screen of FIG. 5A, numbers "1" to "6" indicate the teaching positions P(1) to P(6), and "0", "100", "200", "300", "400", "500", "600", and "700" indicate positions at each clock time. In FIG. 5A, the teaching positions P(1) to P(6) each correspond to the clock times "200", "300", "400", "600", "700", "0".

Note that in a case where the control device 100 receives the input on the display screen of FIG. 5A via the input unit 150, e.g., a case where the user touches a position on a path, the control device 100 may display a clock time corresponding to the input position.

In a case where the display screen of FIG. 5A is displayed as the user interface and the control device 100 receives the input via the input unit 150, e.g., the user touches a position on the path, the control device 100 may receive the input position or clock time as, e.g., a specified synchronization start position, synchronization start clock time, or temporary stop position.

The user interface on the display screen of FIG. 5A may have an output button (not shown). In this case, in a case where the user clicks the output button (not shown) via the input unit 150, the list of the clock times and positions of the interpolation data may be output in a predetermined form.

The display unit 170 may display the display screen of FIG. 5B as the user interface, and in a case where the user inputs a clock time such as "10 ms" as the synchronous operation start position via the input unit 150, may display a position corresponding to such a clock time. Note that an "EXTERNAL CLOCK" in FIG. 5B indicates the reference clock 201.

<Control Unit 110>

The control unit 110 is one well-known by those skilled in the art, and has a CPU, a ROM, a RAM, a complementary metal-oxide-semiconductor (CMOS) memory, etc. These components are communicable with each other via a bus.

The CPU is a processor that controls the control device 100 in an integrated manner. The CPU reads a system program and an application program stored in the ROM via the bus, and controls the entirety of the control device 100 according to the system program and the application program. With this configuration, the control unit 110 implements the functions of the internal clock 111, the internal clock correction unit 112, the reference clock correction unit 113, the saving unit 114, the operation unit 115, the deceleration start timing calculation unit 116, and the restart processing unit 117, as shown in FIG. 2. The RAM stores various types of data such as temporary calculation data and display data. The CMOS memory is configured as a non-volatile memory backed up by a not-shown battery and holding the storage state thereof even after the control device 100 has been powered off.

The internal clock 111 updates the clock time by adding an arbitrary increment time in every interpolation period (e.g., 1 ms) in the control unit 110.

Specifically, the increment time Δtc of the internal clock 111 is calculated, in the control device 100, using an interpolation period ITP which is a fixed value and a currently-set override OVRD from (Expression 1).

$$\Delta tc = \mathrm{ITP} \times \mathrm{OVRD} \quad \text{(Expression 1)}$$

As shown in (Expression 1), in a case where the override OVRD is 100%, the increment time Δtc of the internal clock 111 and the interpolation period ITP are equal to each other, and the increment time Δtc of the internal clock 111 can be changed by changing the value of the override OVRD.

Here, the override OVRD is a percentage with respect to the operation speed of the robot Ra described in the operation program. For example, in a case where the override OVRD is set to 100% and an operation speed of 2000 mm/sec is set in the operation program as shown in FIG. 3, the robot Ra operates at a speed of 2000 mm/sec. In a case where the override OVRD is 50%, the robot operates at a speed of 1000 mm/sec. Here, the maximum value of the override OVRD is 100%, and in this case, the override is calculated as "1.0". In a case where the override OVRD is 50, the override is calculated as "0.5".

The internal clock correction unit 112 corrects, using a well-known technique (e.g., Patent Document 3), the clock time of the internal clock 111 such that the clock time of the internal clock 111 is adjusted to the clock time of the reference clock 201, for example.

In a case where it is determined that the internal clock 111 cannot operate in synchronization with the reference clock 201 even after the correction calculation for the internal clock 111, the reference clock correction unit 113 calculates, using a well-known technique (e.g., Patent Document 3), such an increment time of the reference clock 201 that the internal clock 111 is synchronizable with the reference clock 201, for example. The reference clock correction unit 113 transmits data on the calculated increment time to the reference clock 201 to change the increment time of the reference clock 201.

Accordingly, the internal clock 111 for the instrument delayed in work is synchronized with the reference clock 201. The internal clock correction units 112 for other instruments not delayed in work correct the increment times of the internal clocks 111 for these other instruments such that the internal clocks 111 are synchronized with the corrected reference clock 201. Finally, all the instruments in the system 1 are synchronized with the clock time of the internal clock 111 of the delayed instrument.

For the synchronous operation with other instruments, the saving unit 114 executes, for example, the created operation program of FIG. 3 in advance in the mode in which no synchronization with the reference clock 201 is made, i.e., based on the clock time of the internal clock 111, thereby saving, in the interpolation data storage unit 132, the data (interpolation data) on the position of the instrument, such as the end effector of the robot Ra, and the clock time from the synchronization start command to the synchronization end command of the operation program as shown in FIG. 4.

Upon the synchronous operation according to the operation program, the operation unit 115 causes each instrument to operate in synchronization with the reference clock 201 based on the reference clock 201 and the data (interpolation data) on the position and the clock time in the interpolation data storage unit 132.

Specifically, for example, in a case where an instruction for execution in a mode in which synchronization with the reference clock 201 is made is received from the user via the input unit 150, the operation unit 115 moves, based on the interpolation data of FIG. 4, the end effector of the robot Ra to the position (x, y, z)=(2500, 0, 1000) corresponding to "100 ms" indicated by the clock command of the second line of the operation program of FIG. 3, and stands by until the clock time of the internal clock 111 reaches "100 ms". The operation unit 115 calculates, based on the interpolation data of FIG. 4, an operation command for movement to a position corresponding to every interpolation period (1 ms) after 100 ms, i.e., 101 ms, 102 ms, etc. Based on the calculated operation command, the operation unit 115 operates the robot Ra in synchronization with the reference clock 201.

Note that the operation units 115 of the press machines 10*a*, 10*b* synchronously operate the press machines 10*a*, 10*b* as in the case of the robot Ra.

In a case where a position or clock time at which the instrument is temporarily stopped or synchronization ends is specified via the input unit 150 as the specifying unit, the deceleration start timing calculation unit 116 calculates a position or clock time at which deceleration needs to be started based on the interpolation data saved for the operation program by the saving unit 114.

Figure 6:
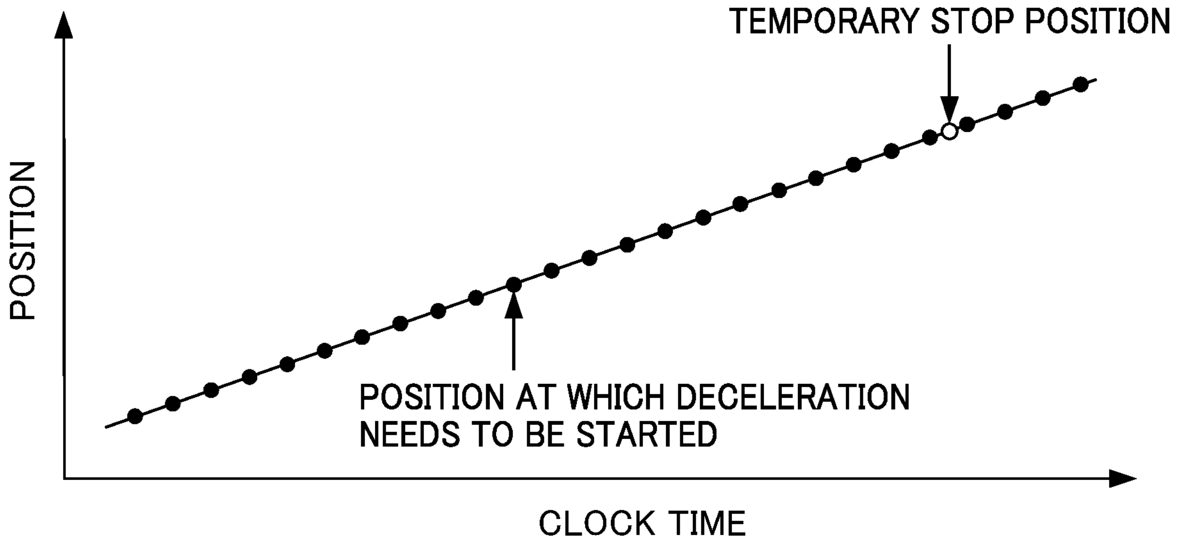
FIG. 6 is a graph showing one example for describing operation of a deceleration start timing calculation unit.

FIG. 6 is a graph showing one example for describing operation of the deceleration start timing calculation unit 116. In FIG. 6, the path of the robot Ra in a certain period is indicated by a solid line. Each black point on such a path indicates, as an example, a position saved in every interpolation period (e.g., 1 ms) as the interpolation data. Moreover, a white circle mark indicates, for example, a temporary stop position specified via the input unit 150.

Note that for example, when the end effector of the robot Ra reaches the temporary stop position indicated by the white circle mark in FIG. 6, if the override OVRD of (Expression 1) is set to "0", i.e., the increment time Δtc of the internal clock 111 is instantaneously changed to "0", the operation speed also rapidly changes. Thus, in some cases, impact is provided to the robot Ra, leading to damage of the robot Ra. The same also applies to the press machines 10*a*, 10*b*.

For this reason, in order to safely stop the instrument, the deceleration start timing calculation unit 116 performs, using a well-known technique (e.g., Patent Document 3), filtering processing for the increment time Δtc of the internal clock 111, thereby calculating the position or clock time at which deceleration needs to be started based on the interpolation data.

Figure 7:
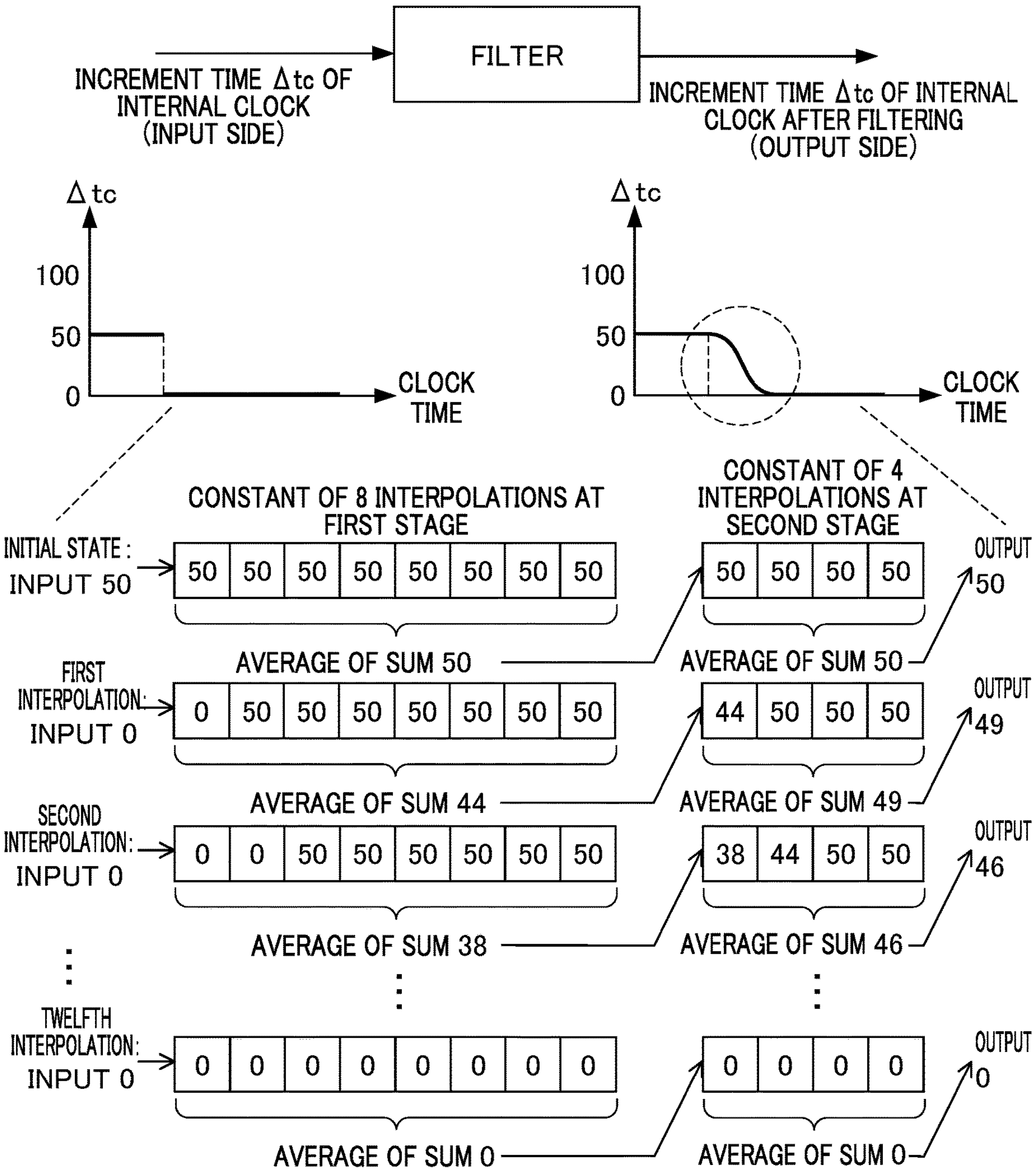
FIG. 7 is a chart showing one example of filtering processing for the increment time of an internal clock.

FIG. 7 is a chart showing the filtering processing for the increment time Δtc of the internal clock 111.

As shown in FIG. 7, in filtering in the deceleration start timing calculation unit 116, a value obtained by performing averaging the number of times corresponding to the time constant of the filter is output as the increment time Δtc to be output in one interpolation period (hereinafter also referred to as "averaging"). Specifically, the deceleration start timing calculation unit 116 performs filtering for a time constant of 8 interpolations at a first stage and a time constant of 4 interpolations at a second stage, i.e., performs averaging twice.

For example, in a case where the input of the increment time Δtc is changed from "50" to "0", the deceleration start timing calculation unit 116 outputs, for example, an increment time Δtc of "44" in first interpolation by averaging at the first stage, and outputs an increment time Δtc of "49" by averaging at the second stage, as shown in FIG. 7. The deceleration start timing calculation unit 116 executes such processing the number of times corresponding to 12 interpolations so that the increment time Δtc can be smoothly changed from "50" to "0" and the instrument can be safely stopped.

In other words, the deceleration start timing calculation unit 116 performs filtering as shown in FIG. 7. With this configuration, in a case where the temporary stop position (or the synchronization end position) is specified via the input unit 150, the deceleration start timing calculation unit 116 can calculate, based on the interpolation data, a position or clock time 12 interpolation periods before the specified temporary stop position (or synchronization end position) as the position or clock time at which deceleration needs to be started.

For example, in a case where for restart of operation after temporary stop, an instruction for restarting the synchronous operation of the instruments is received from the user via the input unit 150, the restart processing unit 117 performs restart processing based on the data (interpolation data), which is saved in the interpolation data storage unit 132 by the saving unit 114, on the position and clock time of the operation program.

Specifically, for example, in a case where operation is restarted from the temporary stop position shown in FIG. 6, the restart processing unit 117 restarts operation of the instrument based on the position and clock time of the interpolation data at each point without performing the interpolation processing again between the temporary stop position (restart position) and the teaching position P(5). With this configuration, the control device 100 can restart, using the interpolation data, operation without ruining the relationship between the position of the instrument and the clock time.

Note that upon restart, the restart processing unit 117 may perform filtering processing for the increment time Δtc of the internal clock 111 as in the deceleration start timing calculation unit 116.

<Saving Processing of Control Device 100>

Next, operation related to saving processing of the control device 100 will be described.

Figure 8:
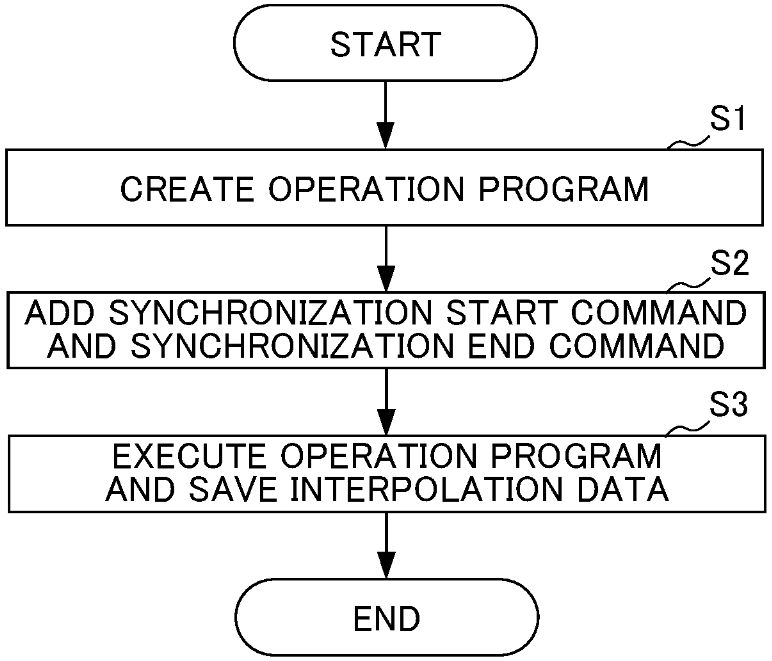
FIG. 8 is a flowchart for describing saving processing of a control device.

FIG. 8 is a flowchart for describing the saving processing of the control device 100. The flow described herein is executed every time the user creates the operation program via the input unit 150.

In Step S1, the control unit 110 creates, based on input operation by the user via the input unit 150, the operation program including the operation commands based on the teaching positions P(1) to P(6).

In Step S2, the control unit 110 adds, based on the synchronization start clock time input by the user via the input unit 150, the synchronization start command and the synchronization end command to the operation program created in Step S1, as shown in FIG. 3.

In Step S3, the saving unit 114 executes, for the synchronous operation with other instruments, the operation program created in Step S2 in advance based on the internal clock 111 in the mode in which no synchronization with the reference clock 201 is made, thereby saving, as the interpolation data, the data on the position and the clock time from the synchronization start command to the synchronization end command of the operation program in the interpolation data storage unit 132.

<Synchronous Operation Processing of Control Device 100>

Next, operation related to synchronous operation processing of the control device 100 will be described.

Figure 9:
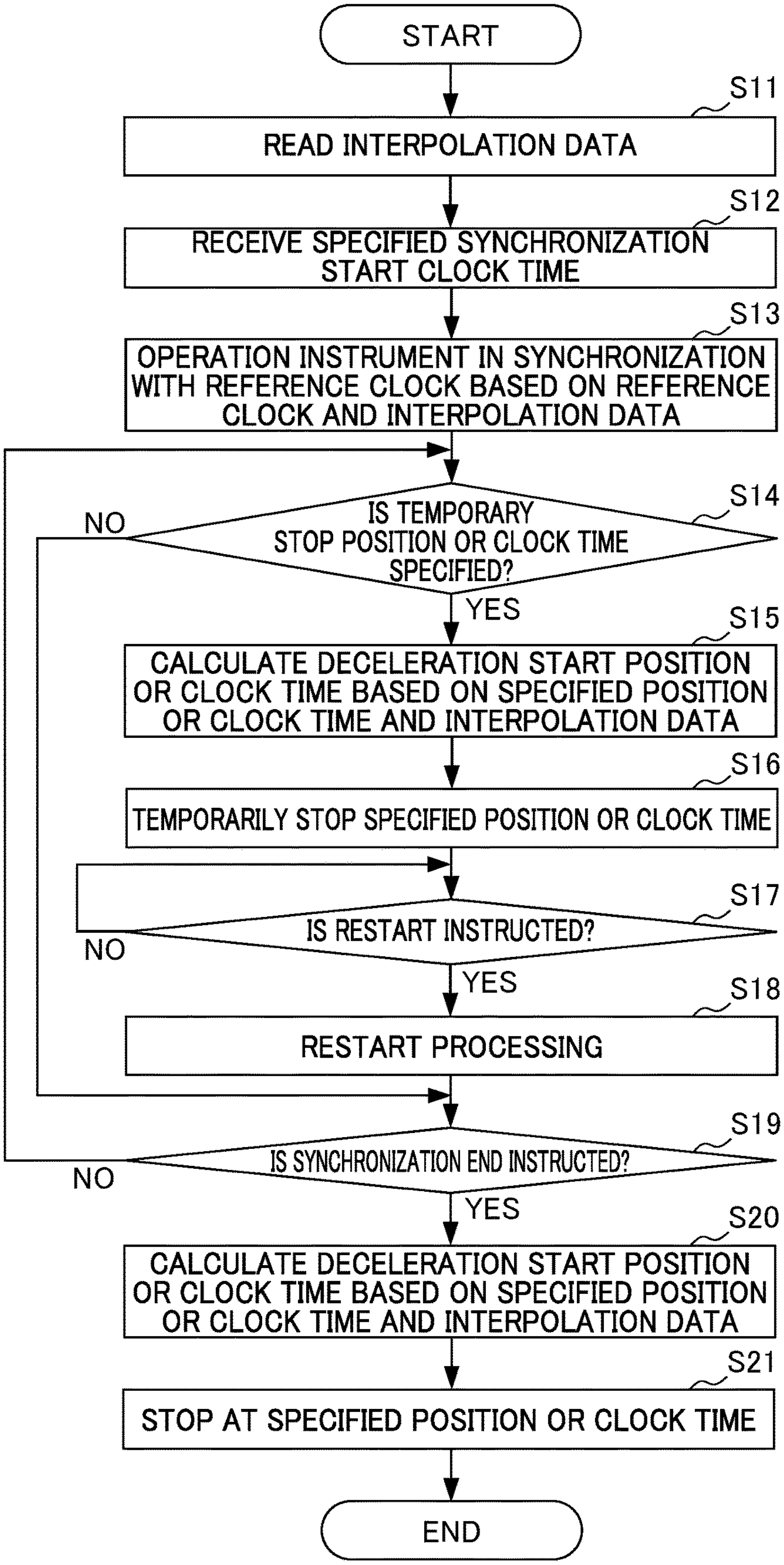
FIG. 9 is a flowchart for describing synchronous operation processing of the control device.

FIG. 9 is a flowchart for describing the synchronous operation processing of the control device 100. The flow described herein is executed by the internal clock correction unit 112 and reference clock correction unit 113 of the control device 100 for synchronizing the clock time of the internal clock 111 and the clock time of the reference clock 201 with each other, and is repeatedly executed every time an instruction for execution in the mode (synchronous operation) in which synchronization with the reference clock 201 is made is received from the user via the input unit 150.

In Step S11, in a case where the instruction for executing the operation program in the mode (synchronous operation) in which synchronization with the reference clock 201 is made is received from the user via the input unit 150, the operation unit 115 reads the interpolation data on the instructed operation program from the interpolation data storage unit 132.

In Step S12, the operation unit 115 receives the synchronization start clock time specified by the user via the input unit 150.

In Step S13, the operation unit 115 stands by at the position of the interpolation data corresponding to the synchronization start clock time specified in step S12, and in a case where the clock time of the reference clock 201 is coincident with the synchronization start clock time, operates the instrument in synchronization with the reference clock 201 based on the reference clock 201 and the interpolation data read in Step S11.

In Step S14, the operation unit 115 determines whether or not the user has specified the temporary stop position via the input unit 150. In a case where the temporary stop position has been specified, the processing proceeds to Step S15. On the other hand, in a case where the temporary stop position has not been specified, the processing proceeds to Step S19.

In Step S15, the deceleration start timing calculation unit 116 calculates the position or clock time at which deceleration needs to be started based on the temporary stop position or clock time specified in Step S14 and the interpolation data.

In Step S16, the operation unit 115 starts deceleration of the instrument at the position or clock time, which is calculated in Step S15, at which deceleration needs to be started, and temporarily stops the instrument at the position or clock time specified in Step S14.

In Step S17, the restart processing unit 117 determines whether or not an instruction for restarting the synchronous operation of the instrument has been received from the user via the input unit 150. In a case where the instruction for restarting the synchronous operation has been received, the processing proceeds to Step S18. On the other hand, in a case where the instruction for restarting the synchronous operation has not been received, the processing stands by in Step S17.

In Step S18, the restart processing unit 117 performs the restart processing based on the interpolation data.

In Step S19, the operation unit 115 determines whether or not an instruction for ending the synchronous operation of the instrument has been received from the user via the input unit 150. In a case where the instruction for ending the synchronous operation has been received, the processing proceeds to Step S20. On the other hand, in a case where the instruction for ending the synchronous operation has not been received, the processing returns to Step S14.

In Step S20, the deceleration start timing calculation unit 116 calculates the position or clock time at which deceleration needs to be started based on the synchronization end position or clock time specified in Step S19 and the interpolation data.

In Step S21, the operation unit 115 starts deceleration of the instrument at the position or clock time, which is calculated in Step S20, at which deceleration needs to be started, and stops the instrument at the position or clock time specified in Step S19.

As described above, the control device 100 according to one embodiment has the interpolation data on the entirety of the operation program so that the synchronous position can be specified based on the arbitrary position on the operation path of the robot Ra or the clock time corresponding thereto instead of specifying the synchronous position in advance by teaching according to the operation statements of the program for the synchronous operation of the robot Ra. Moreover, the position is uniquely determined from the clock time based on the interpolation data, and therefore, the control device 100 only sets the corresponding clock time and teaching of the synchronization start position is facilitated.

Further, since the control device 100 has the interpolation data on the entirety of the operation program, the position from which deceleration needs to be started can be easily determined without the need for reading ahead the operation statements and calculating the interpolation data in a case where the instrument is temporarily stopped or synchronization ends at an arbitrary specified position.

In addition, the control device 100 does not recalculate the interpolation data even upon restart after temporary stop, and therefore, the relationship between the position and the clock time of the reference clock is not ruined.

Moreover, the saved interpolation data is the command position when the operation program is actually executed, and therefore, a program that due to performance of a motor or the inertia of the robot Ra, the instrument cannot operate as instructed by a calculated command and the relationship between the position and the clock time cannot be held can be avoided.

One embodiment has been described above, but the system 1 and the control device 100 are not limited to those of the above-described embodiment and modifications, improvements, etc. are included in such a scope that the object can be achieved.

First Modification

In one embodiment, the control device 100 displays the display screen shown in FIG. 5A as the user interface, and for example, the synchronization start position, synchronization start clock time, or temporary stop position specified by touching the position on the path by the user via the input unit 150 is received. However, the present invention is not limited to above. For example, the control device 100 may display a user interface on a display screen shown in FIG. 10, and the input of a plurality of clock times may be received as an intended temporary stop position from the user via the input unit 150.

Second Modification

For example, in the above-described embodiment, the control device 100 employs, as the specified synchronization start clock time, the set value of the clock command of the operation program of FIG. 3. However, the present invention is not limited to above. For example, the control device 100 may receive a synchronization start position specified by the user via the input unit 150. In this case, at the time of the start of the synchronous operation, the operation unit 115 stands by at the position of the interpolation data corresponding to the specified synchronization start position (or the position of the interpolation data closest to the specified synchronization start position) until the corresponding synchronization start clock time, and when the clock time of the reference clock 201 becomes coincident with the synchronization start clock time, may cause the instrument to perform the synchronous operation based on the reference clock 201 and the interpolation data.

Third Modification

For example, in the above-described embodiment, the control device 100 executes the created operation program in advance based on the clock time of the internal clock 111, thereby saving, in the interpolation data storage unit 132, the interpolation data on the instrument from the synchronization start command to the synchronization end command of the operation program. However, the present invention is not limited to above. For example, the control device 100 may cause a simulation device (not shown) to execute the created operation program in advance, thereby saving, as the interpolation data, the data on the position and the clock time from the synchronization start command to the synchronization end command of the operation program in the interpolation data storage unit 132.

Note that each function of the system 1 and the control device 100 according to one embodiment may be implemented by hardware, software, or a combination thereof. Here, implementation by the software means implementation by reading and execution of a program by a computer.

The program can be stored using various types of non-transitory computer readable media and be supplied to the computer. The non-transitory computer readable media include various types of tangible storage media. Examples of the non-transitory computer readable media include magnetic recording media (e.g., a flexible disk, a magnetic tape, and a hard disk drive), magnetic optical recording media (e.g., a magnetic optical disk), a CD-read only memory (CD-ROM), a CD-R, a CD-R/W, and semiconductor memories (e.g., a mask ROM, a programmable ROM (PROM), an erasable PROM (EPROM), a flash ROM, and a RAM). The program may be supplied to the computer by means of various types of transitory computer readable media. Examples of the transitory computer readable media include an electric signal, an optical signal, and an electromagnetic wave. The transitory computer readable medium can supply the program to the computer via a wired communication path such as an electric wire or an optical fiber or a wireless communication path.

Note that the steps of describing the program recorded in the recording medium include not only processing performed in chronological order, but also processing executed in parallel or separately.

In other words, the system and control device of the present disclosure may include various embodiments having the following configurations.

(1) The system 1 of the present disclosure is the system including the robot Ra and the press machines 10*a*, 10*b* which are the machine tools, the robot Ra and the press machines 10*a*, 10*b* cooperating with each other. The system 1 includes the reference clock 201 that periodically updates the clock time. At least one of the robot Ra or the press machines 10*a*, 10*b* includes the internal clock 111, the saving unit 114 that saves, by executing the created operation program in advance based on the internal clock 111, the data on the positions and the clock times from the synchronization start command to the synchronization end command of the operation program, and the operation unit 115 that operates at least one of the robot Ra or the press machines 10*a*, 10*b* in synchronization with the reference clock 201 based on the reference clock 201 and the position and clock-time data of the operation program saved by the saving unit 114 in the synchronous operation according to the operation program.

The system 1 has the interpolation data on the entirety of the operation program so that the synchronous position can be specified based on the arbitrary position on the operation path of the robot Ra or the clock time corresponding thereto instead of specifying the synchronous position in advance by teaching according to the operation statements of the program for the synchronous operation of the robot Ra. Moreover, the position is uniquely determined from the clock time based on the interpolation data, and therefore, the system 1 only sets the corresponding clock time and teaching of the synchronization start position is facilitated.

(2) The system 1 of the present disclosure is the system including the robot Ra and the press machines 10*a*, 10*b* which are the machine tools, the robot Ra and the press machines 10*a*, 10*b* cooperating with each other. The system 1 includes the reference clock 201 that periodically updates the clock time. At least one of the robot Ra or the press machines 10*a*, 10*b* includes the internal clock 111, the saving unit 114 that saves, by causing the simulation device (not shown) that simulates at least one of the robot Ra or the press machines 10*a*, 10*b* to execute the created operation program in advance, data on the positions and the clock times from the synchronization start command to the synchronization end command of the operation program, and the operation unit 115 that operates at least one of the robot Ra or the press machines 10*a*, 10*b* in synchronization with the reference clock 201 based on the reference clock 201 and the position and clock-time data of the operation program saved by the saving unit 114 in the synchronous operation according to the operation program.

According to the system 1, advantageous effects similar to those of (1) can be provided.

(3) In the system 1 according to (1) or (2), the position and clock-time data of the operation program may be the data on the position and the clock time in every interpolation period in execution of the operation program.

With this configuration, the saved interpolation data is the command position when the operation program is actually executed, and therefore, the program that due to the performance of the motor or the inertia of the robot Ra, the instrument cannot operate as instructed by the calculated command and the relationship between the position and the clock time cannot be held can be avoided.

(4) In the system 1 according to any one of (1) to (3), at least one of the robot Ra or the press machines 10*a*, 10*b* which are the machine tools may further include the input unit 150 that arbitrarily specifies the synchronization start position or the synchronization start clock time. The operation unit 115 may stand by, at the time of the start of the synchronous operation, at the position or clock time, which corresponds to the specified synchronization start position or synchronization start clock time, of the position and clock-time data of the operation program saved by the saving unit 114, and when the clock time of the reference clock 201 becomes coincident with the synchronization start clock time, synchronously operate at least one of the robot Ra or the press machines 10*a*, 10*b* based on the reference clock 201 and the position and clock-time data of the operation program saved by the saving unit 114.

With this configuration, the system 1 can start the synchronous operation at an arbitrary clock time.

(5) In the system 1 according to (4), at least one of the robot Ra or the press machines 10*a*, 10*b* which are the machine tools may include the deceleration start timing calculation unit 116 that calculates the position or clock time at which deceleration needs to be started based on the position and clock-time data of the operation program saved by the saving unit 114 in a case where the input unit 150 has specified the position or clock time at which at least one of the robot Ra or the press machines 10*a*, 10*b* is temporarily stopped or synchronization ends.

With this configuration, the system 1 has the interpolation data on the entirety of the operation program, and therefore, the position from which deceleration needs to be started can be easily determined without the need for reading ahead the operation statements and calculating the interpolation data in a case where the instrument is temporarily stopped or synchronization ends at the arbitrary specified position.

(6) In the system 1 according to (5), at least one of the robot Ra or the press machines 10*a*, 10*b* which are the machine tools may include the restart processing unit 117 that performs, for restart of the operation after temporary stop, the restart processing based on the position and clock-time data of the operation program saved by the saving unit 114.

With this configuration, the system 1 does not recalculate the interpolation data even upon restart after temporary stop, and therefore, the relationship between the position and the clock time of the reference clock is not ruined.

(7) In the system 1 according to any one of (4) to (6), at least one of the robot Ra or the press machines 10*a*, 10*b* which are the machine tools may further include the display unit 170 that displays the user interface that receives the specified synchronization start position or synchronization start clock time.

With this configuration, the user can easily specify the synchronization start position or the synchronization start clock time.

(8) In the system 1 according to any one of (4) to (6), at least one of the robot Ra or the press machines 10*a*, 10*b* which are the machine tools may further include the user interface that displays the position and clock-time data of the operation program saved by the saving unit 114 or receives the output of the list of the positions and clock times of the position and clock-time data of the operation program saved by the saving unit 114.

With this configuration, the user can easily grasp the relationship between the position and the clock time in the operation program.

(9) The control device 100*c* of the present disclosure is the control device for the robot Ra used in the system 1 according to any one of (1) to (8).

According to the control device 100*c*, advantageous effects similar to those of any one of (1) to (8) can be provided.

(10) The control devices 100*a*, 100*b* of the present disclosure are the control devices for the press machines 10*a*, 10*b* which are the machine tools used in the system 1 according to any one of (1) to (8).

According to the control devices 100*a*, 100*b*, advantageous effects similar to those of any one of (1) to (8) can be provided.

EXPLANATION OF REFERENCE NUMERALS

1 System
10*a*, 10*b* Press Machine
100*a* to 100*c* Control Device
110 Control Unit
111 Internal Clock
112 Internal Clock Correction Unit
113 Reference Clock Correction Unit
114 Saving Unit
115 Operation Unit
116 Deceleration Start Timing Calculation Unit
117 Restart Processing Unit
130 Storage Unit
131 Program Storage Unit
132 Interpolation Data Storage Unit
150 Input Unit
170 Display Unit
20 PLC
201 Reference Clock
Ra Robot

The invention claimed is:

1. A system including a robot and at least one of a machine tool or other robot, the robot and at least one of the machine tool or the other robot cooperating with each other, comprising:

a reference clock that periodically updates a clock time, wherein at least one of the robot, the machine tool, or the other robot includes an internal clock, a saving unit that saves, by executing a created operation program in advance based on the internal clock, data on a position and a clock time from a synchronization start command to a synchronization end command of the operation program, and an operation unit that, based on the reference clock and the position and clock-time data of the operation program saved by the saving unit, operates at least one of the robot, the machine tool, or the other robot in synchronization with the reference clock in synchronous operation according to the operation program, and wherein the robot waits, in advance, at a position as a synchronization start position determined from a clock time that a clock command of the operation program indicates based on the saved data on a position and a clock time, instead of a synchronous position specified in advance by operation statements of the operation program, and starts to perform synchronous operation with the machine tool or the other robot based on the reference clock and the saved data on a position and a clock time when the clock time of the reference clock of the robot becomes coincident with synchronization start clock time.

2. The system according to claim 1, wherein the position and clock-time data of the operation program is data on a position and a clock time in every interpolation period in execution of the operation program.

3. The system according to claim 1, wherein at least one of the robot, the machine tool, or the other robot further includes a specifying unit that arbitrarily specifies a synchronization start position or a synchronization start clock time, and the operation unit stands by, at a time of a start of the synchronous operation, at a position or clock time, which corresponds to the specified synchronization start position or synchronization start clock time, of the position and clock-time data of the operation program saved by the saving unit, and when the clock time of the reference clock becomes coincident with the synchronization start clock time, synchronously operates at least one of the robot, the machine tool, or the other robot based on the reference clock and the position and clock-time data of the operation program saved by the saving unit.

4. The system according to claim 3, wherein at least one of the robot, the machine tool, or the other robot includes a deceleration start timing calculation unit that calculates a position or clock time at which deceleration needs to be started based on the position and clock-time data of the operation program saved by the saving unit in a case where the specifying unit has specified a position or clock time at which at least one of the robot, the machine tool, or the other robot is temporarily stopped or synchronization ends.

5. The system according to claim 4, wherein at least one of the robot, the machine tool, or the other robot includes a restart processing unit that performs, for restart of the operation after temporary stop, restart processing based on the position and clock-time data of the operation program saved by the saving unit.

6. The system according to claim 3, wherein at least one of the robot, the machine tool, or the other robot further includes a display unit that displays a user interface that receives the specified synchronization start position or synchronization start clock time.

7. The system according to claim 3, wherein at least one of the robot, the machine tool, or the other robot further includes a user interface that displays the position and clock-time data of the operation program saved by the saving unit or receives an output of a list of the position and clock time of the position and clock-time data of the operation program saved by the saving unit.

8. A control device for the robot used in the system according to claim 1.

9. A control device for at least one of the machine tool or the other robot used in the system according to claim 1.

10. A system including a robot and at least one of a machine tool or other robot, the robot and at least one of the machine tool or the other robot cooperating with each other, comprising:

a reference clock that periodically updates a clock time, wherein at least one of the robot, the machine tool, or the other robot includes an internal clock, a saving unit that saves, by causing a simulation device that simulates at least one of the robot, the machine tool, or the other robot to execute a created operation program in advance, data on a position and a clock time from a synchronization start command to a synchronization end command of the operation program, and an operation unit that, based on the reference clock and the position and clock-time data of the operation program saved by the saving unit, operates at least one of the robot, the machine tool, or the other robot in synchronization with the reference clock in synchronous operation according to the operation program, and wherein the robot waits, in advance, at a position as a synchronization start position determined from a clock time that a clock command of the operation program indicates based on the saved data on a position and a clock time, instead of a synchronous position specified in advance by operation statements of the operation program, and starts to perform synchronous operation with the machine tool or the other robot based on the reference clock and the saved data on a position and a clock time when the clock time of the reference clock of the robot becomes coincident with synchronization start clock time.

11. The system according to claim 10, wherein the position and clock-time data of the operation program is data on a position and a clock time in every interpolation period in execution of the operation program.

12. The system according to 10, wherein at least one of the robot, the machine tool, or the other robot further includes a specifying unit that arbitrarily specifies a synchronization start position or a synchronization start clock time, and the operation unit stands by, at a time of a start of the synchronous operation, at a position or clock time, which corresponds to the specified synchronization start position or synchronization start clock time, of the position and clock-time data of the operation program saved by the saving unit, and when the clock time of the reference clock becomes coincident with the synchronization start clock time, synchronously operates at least one of the robot, the machine tool, or the other robot based on the reference clock and the position and clock-time data of the operation program saved by the saving unit.

13. The system according to claim 12, wherein at least one of the robot, the machine tool, or the other robot includes a deceleration start timing calculation unit that calculates a position or clock time at which deceleration needs to be started based on the position and clock-time data of the operation program saved by the saving unit in a case where the specifying unit has specified a position or clock time at which at least one of the robot, the machine tool, or the other robot is temporarily stopped or synchronization ends.

14. The system according to claim 13, wherein at least one of the robot, the machine tool, or the other robot includes a restart processing unit that performs, for restart of the operation after temporary stop, restart processing based on the position and clock-time data of the operation program saved by the saving unit.

15. The system according to claim 12, wherein at least one of the robot, the machine tool, or the other robot further includes a display unit that displays a user interface that receives the specified synchronization start position or synchronization start clock time.

16. The system according to claim 12, wherein at least one of the robot, the machine tool, or the other robot further includes a user interface that displays the position and clock-time data of the operation program saved by the saving unit or receives an output of a list of the position and clock time of the position and clock-time data of the operation program saved by the saving unit.

17. A control device for the robot used in the system according to claim 10.

18. A control device for at least one of the machine tool or the other robot used in the system according to claim 10.

* * * * *